US007896737B2

(12) United States Patent
Gauselmann

(10) Patent No.: US 7,896,737 B2
(45) Date of Patent: Mar. 1, 2011

(54) SCATTER SYMBOL FEATURE IN A GAMING DEVICE DISPLAYING REELS

(75) Inventor: Michael Gauselmann, Espelkamp (DE)

(73) Assignee: Atronic International GmbH, Lübbecke (DE)

( * ) Notice: Subject to any disclaimer, the term of this patent is extended or adjusted under 35 U.S.C. 154(b) by 1410 days.

(21) Appl. No.: 11/159,523

(22) Filed: Jun. 22, 2005

(65) Prior Publication Data

US 2007/0021187 A1 Jan. 25, 2007

(51) Int. Cl.
*A63F 13/00* (2006.01)

(52) U.S. Cl. ........................ 463/20; 463/25; 273/143 R

(58) Field of Classification Search .................. 463/20; 273/143 R
See application file for complete search history.

(56) References Cited

U.S. PATENT DOCUMENTS 6,093,102 A * 7/2000 Bennett ....................... 463/20
6,322,309 B1 * 11/2001 Thomas et al. ................ 413/20
7,040,985 B2 * 5/2006 Vancura ....................... 463/20

* cited by examiner

*Primary Examiner*—Dmitry Suhol
*Assistant Examiner*—Malina K Rustemeyer
(74) *Attorney, Agent, or Firm*—Patent Law Group LLP; Brian D. Ogonowsky

(57) ABSTRACT

Disclosed herein is a game played on a gaming device that displays a randomly selected array of symbols, where the symbols across one or more pay lines are evaluated by circuitry to determine an award to be granted. In one embodiment, the gaming device allows the player to designate a position in the array for a next spin of the virtual reels. After the next spin, the symbol in that designated position becomes a scatter symbol. A scatter symbol is a symbol whose significance applies whether it occurs on a certain pay line or not. A certain number of scatter symbols in the array causes an award to be granted to the player. The scatter symbols may have other special award features, such as a providing an award multiplier or initiating a bonus game.

21 Claims, 4 Drawing Sheets

SCATTER SYMBOL FEATURE IN A GAMING DEVICE DISPLAYING REELS

FIELD OF THE INVENTION

This invention relates to gaming devices, such as slot machines, and, in particular, to an additional feature performed in a game that grants awards to a player based upon symbol combinations.

BACKGROUND

Common slot machines randomly select and display an array of symbols on a video screen, then grant an award to a player based on the occurrence of certain symbol combinations across pay lines. Typically, the game ends after the symbols are displayed and the award, if any, is granted. Although these types of games are highly successful, it is advantageous to provide an additional feature to this basic game to make the game more interesting to a player. A more interesting game will generate increased revenue to the casino by its increased play.

SUMMARY

Disclosed herein is a game played on a gaming device that displays a randomly selected array of symbols, such as a video slot machine or a video monitor connected to a computer for on-line gaming. In one embodiment, the array is 5×3 symbol positions. The combinations of symbols across one or more activated pay lines are evaluated by a processor to determine an award to be granted. The present invention adds an additional feature to this conventional operation of a gaming machine.

One embodiment of the present invention allows the player to designate a symbol position in the 5×3 array to have a special function for the next spin of the virtual reels. After the next spin, the symbol in that designated position becomes a scatter symbol. A scatter symbol is a symbol whose significance applies whether it occurs on an activated pay line or not. In one example, the spin resulted in the symbol "C" occurring in the selected position. All "Cs" in the array are then scatter symbols. In one embodiment, three scatter symbols (i.e., Cs) pay a first award, four scatter symbols pay a higher award, and five scatter symbols pay an even higher award. In another embodiment, the scatter symbols multiply an award based on the number of scatter symbols. Many other award features can apply to the scatter symbols.

In one embodiment, the player pays for the opportunity to designate one or more positions for the scatter symbols. In another embodiment, the opportunity for designating the one or more positions occurs as a bonus if the previous spin resulted in a certain winning combination of symbols. Alternatively, the opportunity may occur randomly or occur based on other criteria.

DETAILED DESCRIPTION

Although the invention can typically be implemented by installing a software program in most types of modern video gaming machines, one particular gaming machine platform will be described in detail.

Figure 1:
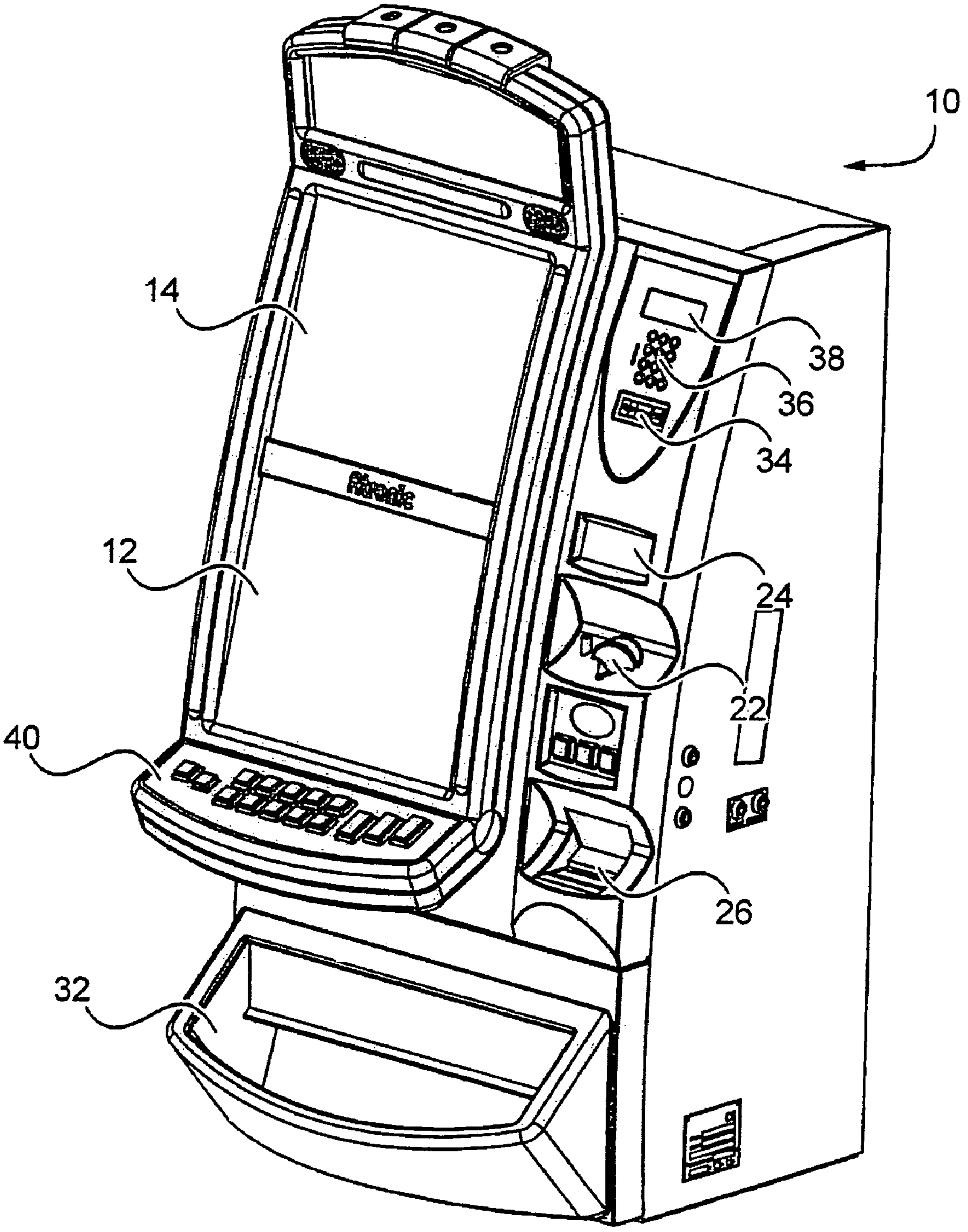
FIG. 1 illustrates a gaming machine that may display a game in accordance with the present invention.

FIG. 1 is a perspective view of a gaming machine 10 that incorporates the present invention. Machine 10 includes a display 12 that may be a thin film transistor (TFT) display, a liquid crystal display (LCD), a cathode ray tube (CRT), or any other type of display. In the preferred embodiment, display 12 has a touch screen feature that enables the player to make selections, such as selecting a symbol position in a displayed array, by touching the symbol position.

A second display 14 provides game data or other information in addition to display 12. Display 14 may provide static information, such as an advertisement for the game, the rules of the game, pay tables, pay lines, or other information, or may even display the game itself along with display 12. Alternatively, the area for display 14 may be a display glass for conveying information about the game.

A coin slot 22 accepts coins or tokens in one or more denominations to generate credits within machine 10 for playing games. An input slot 24 for an optical reader and printer receives machine readable printed tickets and outputs printed tickets for use in cashless gaming. A bill acceptor 26 accepts various denominations of banknotes.

A coin tray 32 receives coins or tokens from a hopper upon a win or upon the player cashing out.

A card reader slot 34 accepts any of various types of cards, such as smart cards, magnetic strip cards, or other types of cards conveying machine readable information. The card reader reads the inserted card for player and credit information for cashless gaming. The card reader may also include an optical reader and printer for reading and printing coded barcodes and other information on a paper ticket.

A keypad 36 accepts player input, such as a personal identification number (PIN) or any other player information. A display 38 above keypad 36 displays a menu for instructions and other information and provides visual feedback of the keys pressed.

Player control buttons 40 include any buttons needed for the play of the particular game or games offered by machine 10 including, for example, a bet button, a repeat bet button, a spin reels button, a maximum bet button, a cash-out button, a display pay lines button, a display payout tables button, select icon buttons, and any other suitable button. Buttons 40 may be replaced by a touch screen with virtual buttons.

Figure 2:
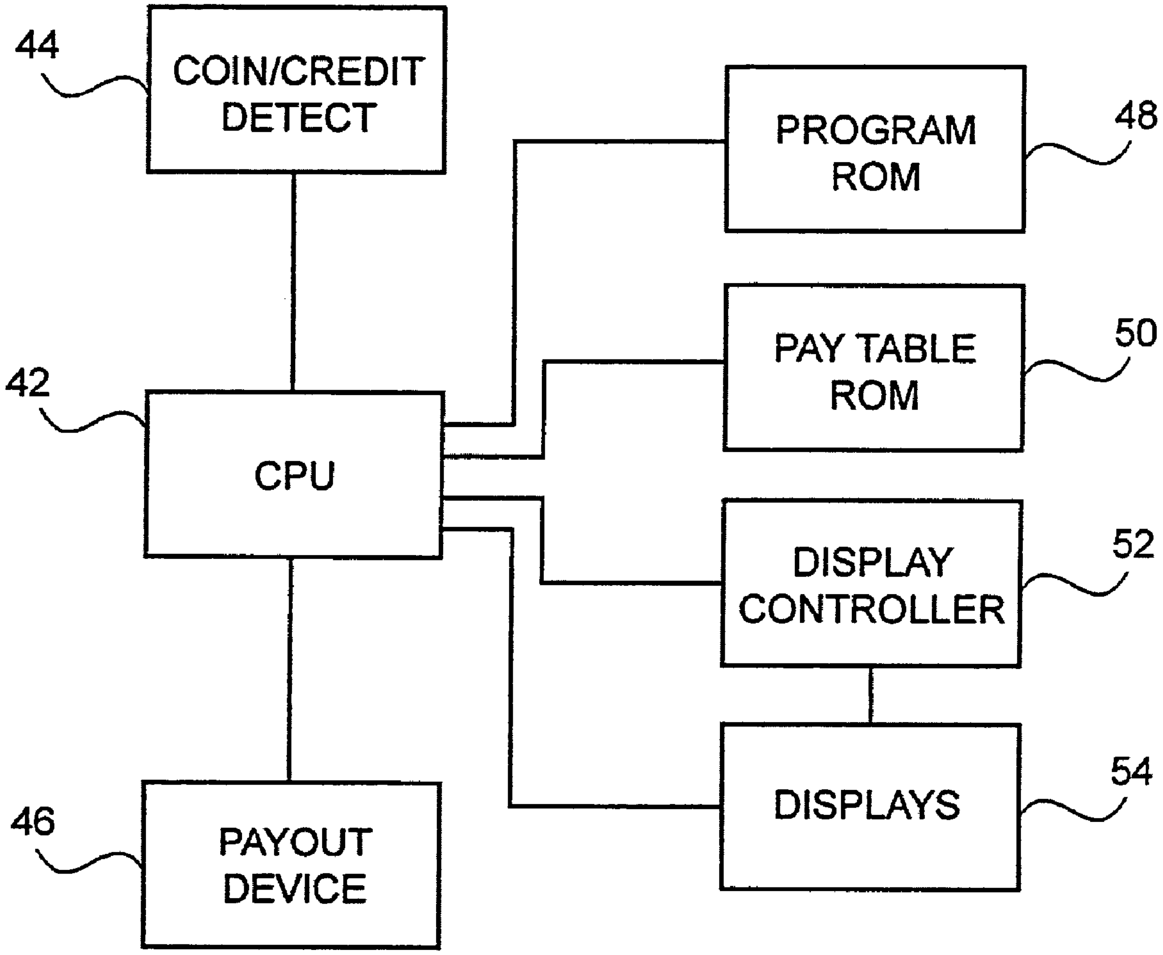
FIG. 2 is a block diagram of key components in the gaming machine of FIG. 1.

FIG. 2 illustrates basic circuit blocks in a suitable gaming device. A control unit (CPU 42) runs a gaming program (including the invention) stored in a program ROM 48. The program ROM 48 may include a pseudo-random number generator program for selecting symbols and for making other random selections. A coin/credit detector 44 enables the CPU 42 to initiate a next game. A pay table ROM 50 detects the outcome of the game and identifies awards to be paid to the player. A payout device 46 pays out an award to the player in the form of coins upon termination of the game or upon the player cashing out. The payout may also be in the form of a coded paper ticket, credits on a smart card or magnetic strip card, or in any other form. A display controller 52 receives commands from the CPU 42 and generates signals for the various displays 54. If a display 54 is a touch screen, player commands may be input through the display screen into the CPU 42.

Figure 3:
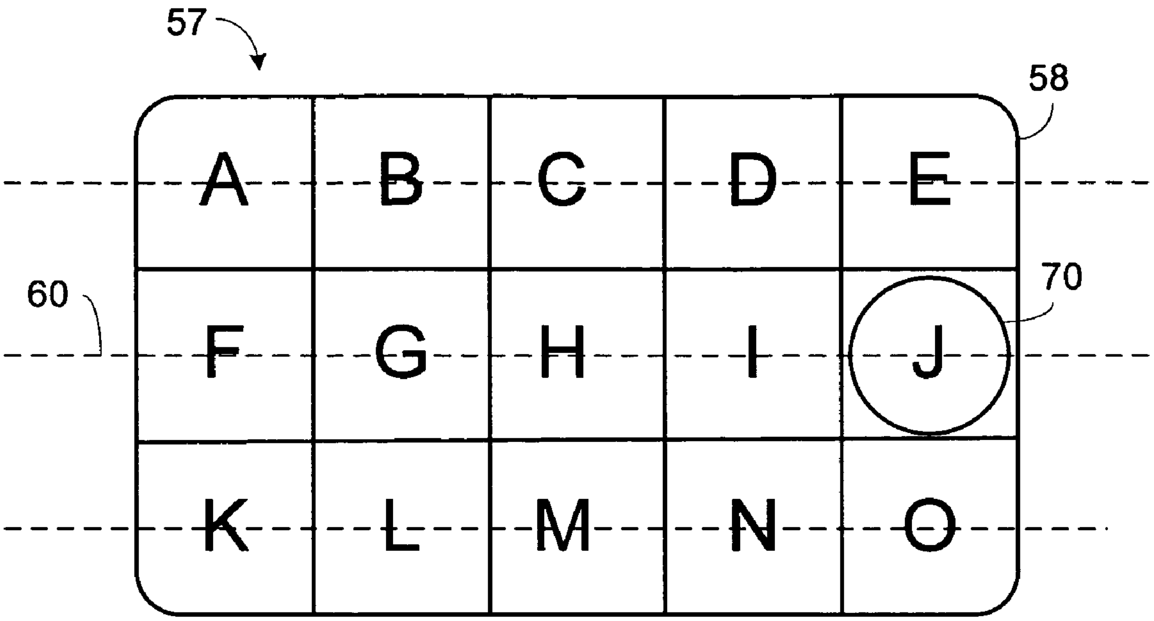
FIG. 3 illustrates a video screen displaying a 5×3 array of symbols and three pay lines, where one symbol position has been selected by the player for a scatter symbol in the next spin.

The invention may be carried out on any form of video game that determines an award based upon combinations of symbols across one or more pay lines. There may be an array of 3×3 symbols, an array of 5×3 symbols, or any other arrangement of symbols. A 5×3 array of symbols will be used as an example, and such an array 57 is shown in FIG. 3, where each symbol position 58 displays a randomly selected symbol, such as letters A-O.

Any pattern of pay lines through the array 57 may be utilized, such as straight or zig-zag pay lines. Three pay lines 60 are illustrated in FIG. 3 for simplicity. Typically, the player bets additional credits to activate more than the center pay line (e.g., one additional pay line per credit bet). In a conventional game, only symbols along an activated pay line are used in forming winning combinations of symbols for paying an award.

Standard symbols include fruit symbols and symbols associated with the theme of the particular slot machine. The particular icons used are not important. Typically, a code associated with each possible symbol is stored in memory, and a pseudo-random number generator selects the symbol to be displayed on the video screen. For amusement, each vertical column of symbols is scrolled to emulate a motor-driven reel, and each of the virtual reels is typically stopped in sequence after a few seconds to reveal the final 5×3 array of symbols.

The invention will be described in conjunction with the screens of FIGS. 3 and 5 and the flowchart of FIG. 4.

Figure 4:
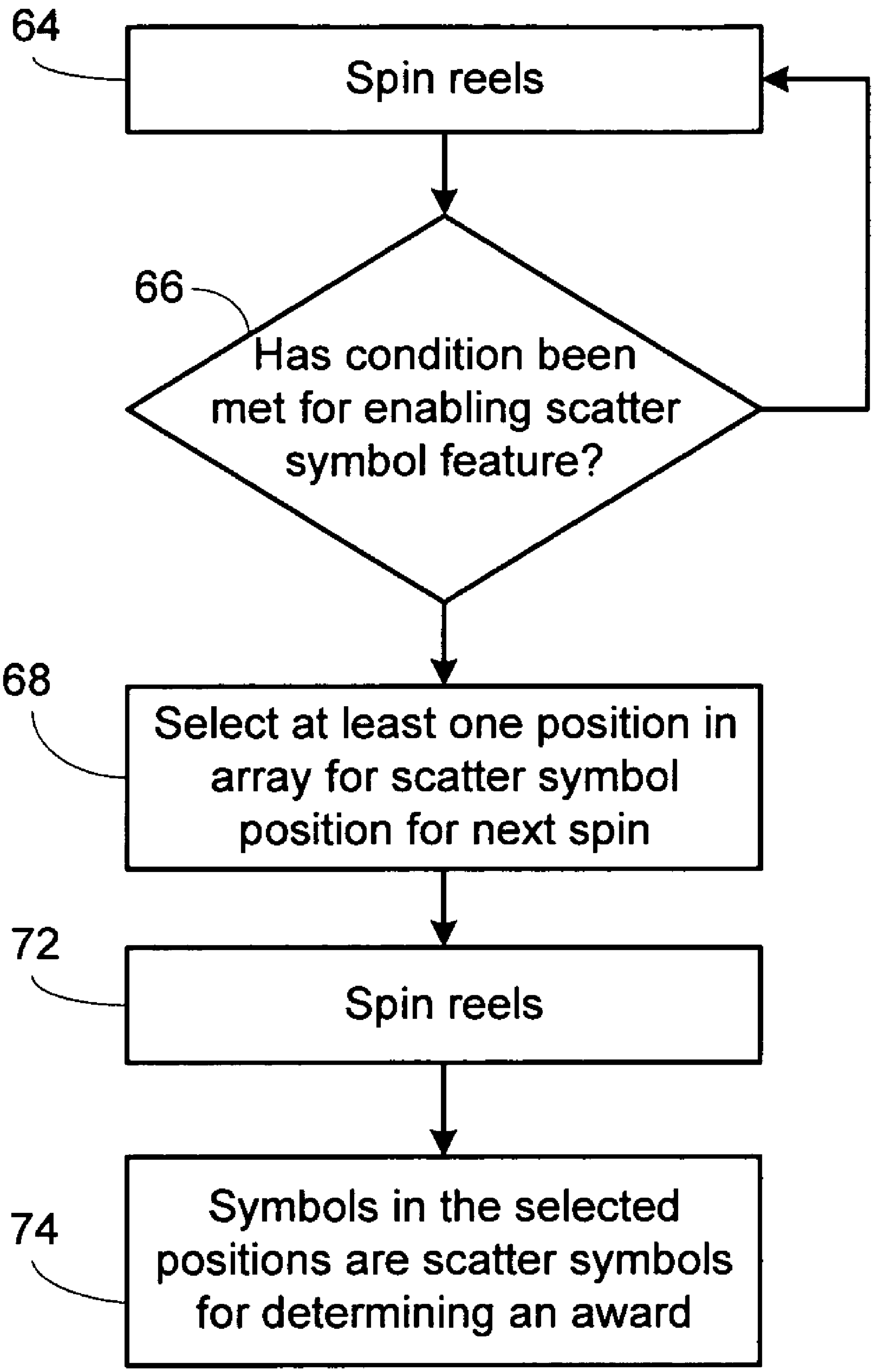
FIG. 4 is a flowchart illustrating one embodiment of the inventive method.

In step 64 of FIG. 4, the player bets credits and spins the virtual reels in a conventional manner. The reels are stopped to display a random array of symbols, shown in FIG. 3, typically selected by a pseudo-random number generator.

In step 66, it is determined whether the condition is met for enabling a scatter symbol feature. Such a condition may be met by the player betting one or more additional credits, by the player betting the maximum credits, by the player obtaining a certain combination of symbols, by a random initiation of the feature, by a predetermined intermittent initiation of the feature, or by any other condition or combination of the above conditions. In one embodiment, the player always gets the feature after each spin, where the condition is simply that the previous spin has been completed.

In step 68, if the condition is met, the player selects one symbol position by touching that position on the display screen. In some circumstances, the player may be given the option of selecting more than one symbol position, such as if the player bet additional credits or obtained a special symbol combination. Only one position is selected in the example for simplicity. In this example, the player chose the middle position on the rightmost reel. That selected symbol position is highlighted such as by displaying a circle 70 in that symbol position.

In step 72, the reels are again spun by the player. The player may be required to bet one or more credits for the spin or the spin may be a free spin as a bonus for a particular symbol combination. FIG. 5 shows the display after the reels have been randomly stopped.

Since the symbol "C" is displayed in the position previously selected by the player (middle position of rightmost reel), that C symbol becomes a scatter symbol, and all other C symbols in the array also become scatter symbols (step 74). The key characteristic of a scatter symbol is that it does not have to be on the same pay line with other scatter symbols for it to be combined with the other scatter symbols to generate an award. Scatter symbols anywhere in the array may be combined or otherwise used to create a winning combination. In some embodiments, scatter symbols may even be combined with non-scatter symbols to generate an award. In one embodiment, a first award is granted for three of the same scatter symbols, a higher award is granted for four of the same scatter symbols, and an even higher award (such as a jackpot) is granted for five of the same scatter symbols.

Figure 5:
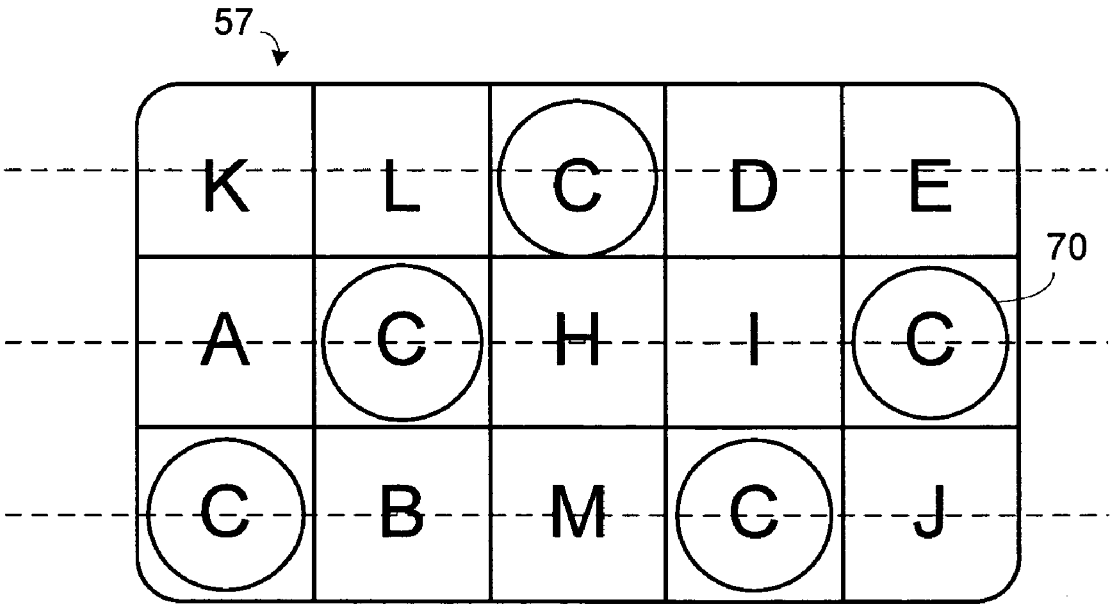
FIG. 5 illustrates the video screen image for the next spin, where the selection of the symbol position in FIG. 3 resulted in the symbol "C" being a scatter symbol.

As shown in the example of FIG. 5, a total of five scatter symbols are displayed. The scatter symbols may be highlighted such as with a circle. In one embodiment, only scatter symbols in different columns may be combined with other scatter symbols.

The scatter symbols may also award special prizes, such as free games, a special bonus game, or other awards. The scatter symbols may act as a wild card for any position on its reel.

In another embodiment, the number of scatter symbols determines a multiplier for any other award obtained by the combination of symbols in either the current spin, the previous spin, or the next spin.

The machine may pay out all the wins from the combinations of the symbols or just the highest win amount.

In one embodiment, the scatter symbol feature applies only to a single spin. In other embodiments, the player may spin multiple times with the same selected scatter symbol position.

In one mode of operation, the number of positions available for selection for a scatter symbol may increase from spin to spin under certain circumstances, such as the player obtaining certain symbol combinations in each spin. Each selected position may identify a different scatter symbol during the next spin so that multiple symbols will be scatter symbols in the next spin. All scatter symbols may have the same value or some scatter symbols may have different functions (e.g., multipliers vs. credits).

In another embodiment, the gaming machine automatically picks one or more scatter symbol positions for the player in step 68.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method performed by a gaming device comprising:

displaying a first array of symbols in an array of symbol positions on a display screen that have been selected pseudo-randomly, the array of symbol positions being rows and columns of symbol positions, certain combinations of symbols along one or more pay lines providing an award for a player;

receiving a signal designating at least one position in the array of symbol positions as the first array of symbols is displayed;

after the step of receiving, displaying a second array of symbols on the display screen that have been selected pseudo-randomly to replace the first array of symbols, each symbol in a respective one of the designated at least one position in the array of symbol positions being converted to a scatter symbol along with any other identical symbols in the second array as a result of previously designating at least one position in the array of symbol positions, a scatter symbol being for use in a combination of symbols without regard to whether or not the scatter symbol is on a same pay line as other symbols in the combination;

determining whether the second array of symbols, including all scatter symbols, results in an award; and granting any award to a player.

2. The method of claim 1 further comprising determining if a condition has been met for receiving the signal designating at least one position in the array of symbol positions.

3. The method of claim 2 wherein the condition comprises detecting the player wagering additional credits to designate at least one position in the array of symbol positions.

4. The method of claim 2 wherein the condition comprises the first array of symbols including a particular combination of symbols.

5. The method of claim 1 wherein receiving a signal designating at least one position in the array of symbol positions comprises receiving a signal designating multiple positions in the array of symbol positions.

6. The method of claim 1 wherein receiving a signal designating at least one position in the array of symbol positions comprises receiving a signal designating one position in the array of symbol positions.

7. The method of claim 1 wherein the scatter symbol provides the function of granting an award to the player for a certain number of scatter symbols anywhere in the second array.

8. The method of claim 1 wherein the scatter symbol provides the function of granting an award to the player for a certain number of scatter symbols in different columns of the second array.

9. The method of claim 1 wherein the scatter symbol provides the function of augmenting an award to the player from a present game, a past game, or a future game.

10. The method of claim 1 wherein the scatter symbol provides the function of granting a bonus game to the player for a certain number of scatter symbols anywhere in the second array.

11. The method of claim 1 wherein the scatter symbol provides the function of granting a bonus game to the player for a certain number of scatter symbols in different columns of the second array.

12. The method of claim 1 wherein determining whether the second array of symbols, including all scatter symbols, results in an award comprises determining if at least a certain number of scatter symbols occurs in the array and granting an award based on the number of scatter symbols.

13. The method of claim 12 wherein receiving a signal designating at least one position in the array of symbol positions comprises receiving a signal from a touch screen generated by a player touching a symbol position in the array of symbol positions.

14. The method of claim 1 wherein the array of symbol positions is a 5×3 array.

15. A gaming device comprising:

a display screen:

a programmed processing system being programmed to carry out the following method:

displaying a first array of symbols in an array of symbol positions on the display screen that have been selected pseudo-randomly, the array of symbol positions being rows and columns of symbol positions, certain combinations of symbols along one or more pay lines providing an award for a player;

receiving a signal designating at least one position in the array of symbol positions as the first array of symbols is displayed;

after the step of receiving, displaying a second array of symbols on the display screen that have been selected pseudo-randomly to replace the first array of symbols, each symbol in a respective one of the designated at least one position in the array of symbol positions being converted to a scatter symbol along with any other identical symbols in the second array as a result of previously designating at least one position in the array of symbol positions, a scatter symbol being for use in a combination of symbols without regard to whether or not the scatter symbol is on a same pay line as other symbols in the combination;

determining whether the second array of symbols, including all scatter symbols, results in an award; and granting any award to a player.

16. The device of claim 15 wherein the processing system is further programmed to determine if a condition has been met for receiving a signal identifying at least one position in the array of symbol positions.

17. The device of claim 16 wherein the condition comprises detecting that the player wagered additional credits to designate at least one position in the array of symbol positions.

18. The device of claim 16 wherein the condition comprises the first array of symbols including a particular combination of symbols.

19. The device of claim 15 wherein the scatter symbol provides the function of granting an award to the player for a certain number of scatter symbols anywhere in the second array.

20. The device of claim 15 wherein the scatter symbol provides the function of granting an award to the player for a certain number of scatter symbols in different columns of the second array.

21. The device of claim 15 wherein the scatter symbol provides the function of augmenting an award to the player from a present game, a past game, or a future game.

* * * * *